Nov. 10, 1959     S. A. PLATT     2,911,846
MOTION TRANSLATING MECHANISM
Filed Sept. 7, 1955     2 Sheets-Sheet 1
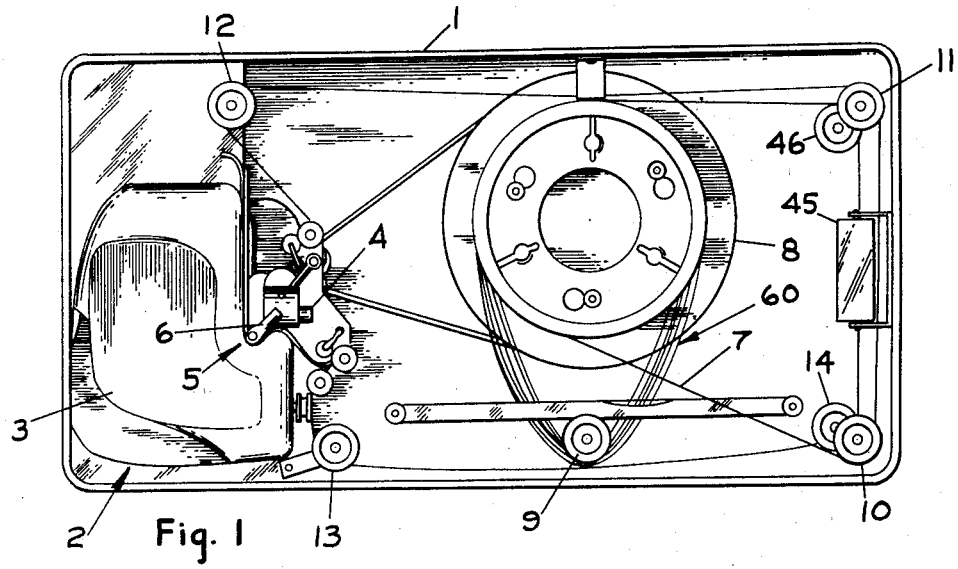
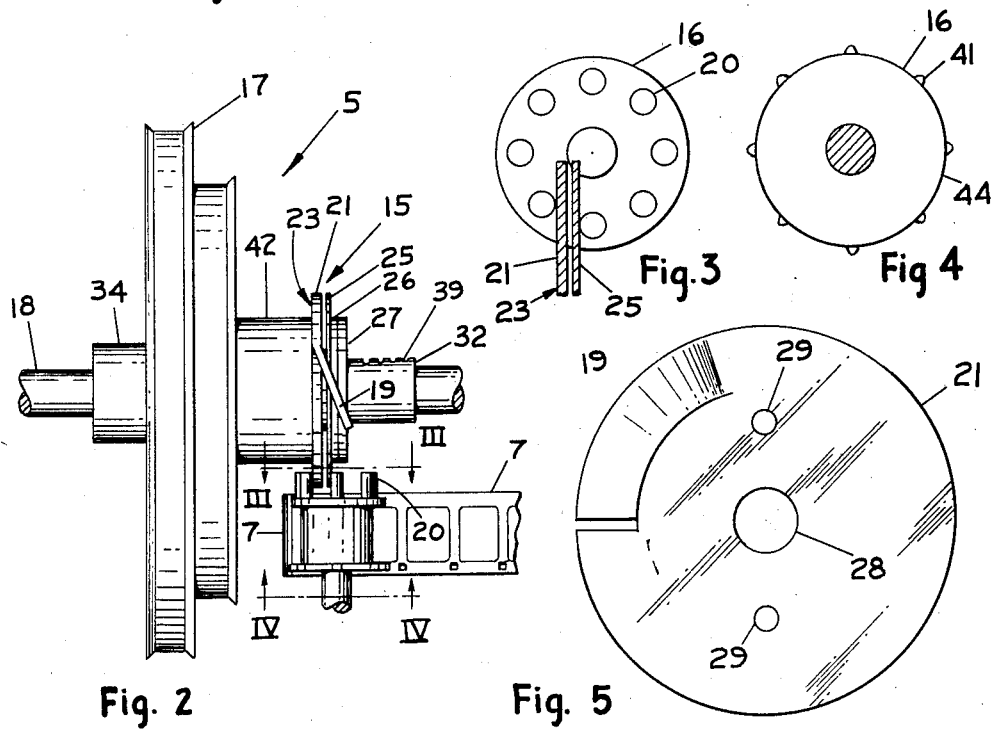
INVENTOR.
Stephen A. Platt
BY
ATTORNEY Nov. 10, 1959     S. A. PLATT     2,911,846
MOTION TRANSLATING MECHANISM Filed Sept. 7, 1955     2 Sheets-Sheet 2

INVENTOR.
Stephen A. Platt
BY
ATTORNEY

United States Patent Office 2,911,846
Patented Nov. 10, 1959

2,911,846

MOTION TRANSLATING MECHANISM

Stephen A. Platt, Grand Haven, Mich.

Application September 7, 1955, Serial No. 532,853

7 Claims. (Cl. 74—426)

This invention relates to a motion translating mechanism for converting rotary motion to intermittent rotary motion. More particularly, this invention relates to a motion translating mechanism for a motion picture projector by which continuous rotary motion is translated to intermittent rotary motion.

Motion translating mechanisms for converting continuous rotary motion to intermittent rotary motion are well-known in many arts including the motion picture projector art. Various and different mechanisms have been developed and utilized for translating continuous rotary motion to intermittent rotary motion so that the film, at a certain number of frames per second is first moved, held stationary, and then moved again to create the optical illusion of motion. It is very important that the mechanism in moving the film from one frame to the next moves the same distance each time and aligns each frame with the projection opening so that only one frame is shown at one time. To assure this alignment such mechanisms have incorporated a so-called indexing means which assures the same movement each time to align the frames and prevent misframing of the projected picture.

Present day motion translating devices, capable of eliminating visible flutter, because of the precision mechanisms required, are bulky and exceedingly costly. These mechanisms also are noisy and subject to excessive wear making their service life short. As far as indexing means for aligning the frames is concerned, the present day mechanisms have not been too satisfactory, especially those units which are relatively inexpensive. Thus, most motion picture projectors are frequently subject to flutter, misalignment and misframing of the pictures.

An object of this invention is to provide a motion translating mechanism for converting continuous rotary motion to intermittent rotary motion, such mechanism being simpler, smaller, and less costly than present day apparatus.

Another object of this invention is to provide a motion translating mechanism which runs smoother and with less noise.

Still another object of this invention is to provide a motion translating mechanism which is not subject to excessive wear.

A further object of this invention is to provide in a motion translating mechanism a novel type of indexing means for assuring the alignment of the picture frames with the projection opening.

Still another object of this invention is to provide an indexing means which is readily adjustable to exactly frame the picture frame within the projection means.

Other objects of this invention will become evident upon reading the following specification in conjunction with the accompanying drawings wherein:

Fig. 1 is an elevational view of the interior of one type of motion picture projection apparatus to which this invention is adapted.

Fig. 2 is a fragmentary side elevational view of a portion of the motion translating mechanism of this invention.

Fig. 3 is a cross sectional view through III—III of Fig. 2.

Fig. 4 is a cross sectional view through IV—IV of Fig. 2.

Fig. 5 is an enlarged end elevational view of the driving unit of this invention.

Figures 6, 7:
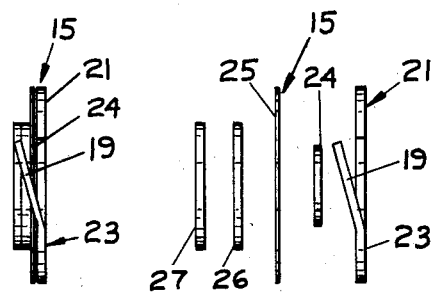
Fig. 6 is a side elevational view of the assembled driving unit of this invention.
Fig. 7 is an exploded view of the driving unit illustrated in Fig. 6.
Figures 8, 9, 10:
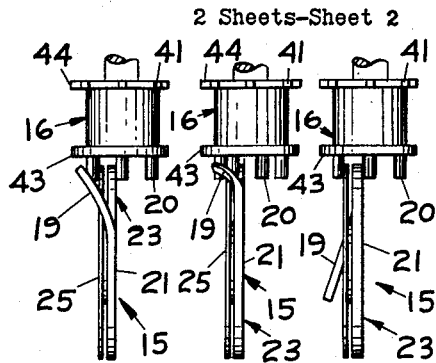

Figs. 8, 9, and 10 show the progressive steps of the driving unit of this invention as it drives the driven element thus translating continuous rotary motion to intermittent rotary motion.

Figure 11:
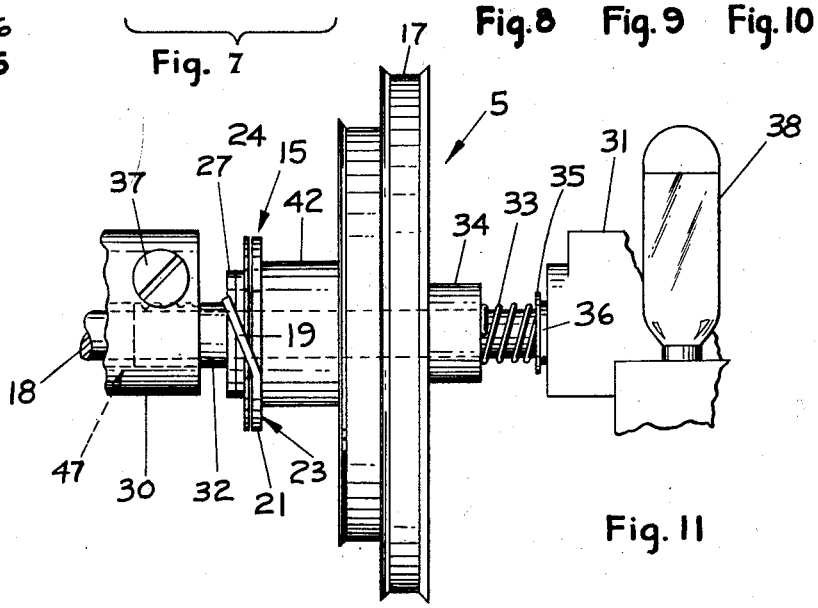

Fig. 11 is a side elevational view of the motion translating mechanism of this invention illustrating the adjustable mounting means for the various elements.

Figure 12:
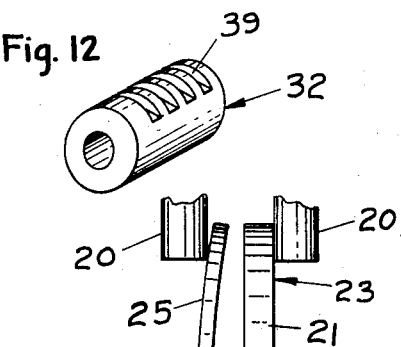

Fig. 12 shows in perspective the bushing used for adjustably mounting the driving unit of the motion translating mechanism.

Figure 13:
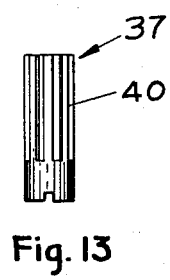

Fig. 13 is a side elevational view of the splined screw used for adjusting the bushing of Fig. 12.

Figure 14:
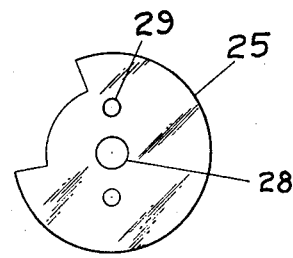

Fig. 14 is an end elevation view of the spring disk.

Figure 15:
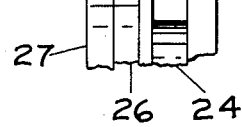

Fig. 15 is an enlarged fragmentary view of the indexing means of this invention.

Briefly, this invention is concerned with a motion translating mechanism for converting continuous rotary motion to intermittent rotary motion. This device comprises a driving member and a driven member having teeth projecting essentially parallel to the axis of its rotation. The driving member has a cam element adapted to engage and move one tooth of the driven member on each cycle of rotation for intermittently moving the driven member. The driving member has an indexing surface stationary axially of the driving member and a resilient element adapted to engage one of the teeth and to rotate with the driven member. The resilient member upon engaging one of the teeth of the driven member forces another tooth against the indexing surface of the driving member while the driven member is stationary. Thus, the film engaging driven member is precisely indexed after each movement of the driven member. Accordingly, the driven member moves the film exactly the same amount each time. Means is provided for adjusting the position of the driving member in respect to the driven member so that the exact location of the picture frame with respect to the projection lens can be adjusted. This motion translating device includes a novel type driven member consisting of a preferably cast, nylon combination sprocket and gear.

Fig. 1 shows a self-contained, endless film projector unit. Reference numeral 1 designates a metal or plastic casing for the unit in which is mounted a projector unit 2 having a cover 3, lens 4, and lever 6. The lever 6 permits the film to be threaded through the intermittent drive mechanism indicated at 5 and located in the projector. The projector 2 is adapted to reflect a picture off the mirror 45 against a suitable screen (not shown). The projector may be of any conventional type except for the motion translating mechanism hereinafter described.

It should be apparent to one skilled in the art that the ribbon of film 7 forms a coil 60 wound on the reel 8 and having its lower loop passing about the spool 9. The film is withdrawn from the inside of the coil 60, passed over spools 10, 11 and 12 and then through the intermittent driving mechanism 5, behind the lens 4 and out of the projector 2. The film then passes over spools 13, 14 and 46 and is rewound on the outside of the coil 60.

The above description of the continuous, self-contained projector unit is made for purposes of illustration only. This invention relates solely to the motion translating mechanism of the projector 2.

Figs. 2 and 11 show the arrangement of the elements of the motion translating mechanism of this invention including the intermittent driving assembly 15 and, in Fig. 2, the driven member or sprocket 16, rotated on shaft 48 and having radial teeth 41 for driving the film 7. The driving assembly 15 is mounted against the hub 42 of the pulley 17. The pulley 17 and the driving assembly 15 rotate with the journaled shaft 18. The driving member has a finger 19 adapted to engage the peg teeth 20 of sprocket 16, thus translating the rotary motion of the driving assembly 15 to the intermittent rotary motion of the sprocket 16.

It is conventional in motion projector sets to provide spaced openings in the pulley 17 and locate a projection bulb 38 (Fig. 11) immediately behind the pulley so that the pulley operates as a shutter for the projector. With such arrangement the intermittent translating mechanism and the projection of the light beam are co-ordinated so that as each frame comes into alignment with the lens, the light beam projects through the lens. However, during the movement of the film the light beam is interrupted by the solid portions of the pulley. Usually the frames are moved into position at the rate of 16 frames per second. Thus, the film is first moved, held stationary, and then moved again to give the optical illusion of motion.

As important function of the driving assembly 15 is to rotate the sprocket 16 intermittently, that is step by step, the angular movement of each step being precisely the same, thus assuring accurate alignment of the frames of the film, driven by sprocket 16, with the lens and light projection opening. It is very important that when the sprocket is stationary the picture frame is precisely and positively aligned with the projection opening. As a result, the driving assembly 15 not only serves the function of intermittently rotating the sprocket 16 but it also indexes the sprocket 16 after each movement. The intermittent rotation of sprocket 16 and the indexing thereof, while stationary, are both accomplished by the driving assembly 15.

The specific construction of the driving assembly 15 includes the driving member 21 having a circumferential cut portion bent outwardly parallel to the axis of rotation of the driving member to form the finger 19. One face 23 of the driving member 21 merges with the finger 19 and serves as a so-called indexing surface. Lying against the other face of the driving member 21 is a resilient spacer 24 which is made of rubber neoprene or other suitable resilient material. Spacer 24 spaces the resilient disk 25 from the driving member 21. Resilient member 25 is made of spring steel and it is backed by the resilient spacer 26 which in turn has a metal disk 27 resting against its opposite side. The spring disk 25 has a circumferential slot 22 of approximately the same length as the finger 19 of the driving member 21 (Fig. 14), thus permitting the finger 19 to extend therethrough. Disks 24, 26, and 27 all have a diameter less than the inner diameter of the finger 19 thus permitting the finger to extend past them. All of the elements of the driving assembly 15 have concentric holes 28 for the shaft 18. The radially spaced holes 29 are provided for locator pins (not shown) projecting from the hub 16 of the pulley 17. In assembled position, the locator pins extend through hole 29, thus securing the driving assembly 15 to the hub 42 and aligning them in operating position. Thus, the pins secure all of the components for rotation in unison.

The arrangement and the dimensions of the components of the driving assembly have to be exact to assure proper operation. The length of finger 19, the axial distance which it extends, and the position of the entire driving assembly 15 in respect to the sprocket 16 is such that once every revolution the finger 19 engages only one of the teeth 20 causing the sprocket 16 to rotate one step. In order to prevent locking of the sprocket 16 it is important that the finger 19 does not strike any other teeth than the one it cams.

The spacing between the face 23 and the outer face of disk 25, when unflexed, is greater than the spacing between two adjacent teeth 20. Thus, in indexing position (Fig. 10), in which position the face 23 engages one tooth 20 and the disk 25 an adjacent tooth 20, the disk 25 is flexed or bent toward the driven member 21. Because of this spacing between the outer faces of disk 25 and member 21, the slope of the camming surface of finger 19 and the transition point between such camming surface and the face 23 is such that as the sprocket 16 rotates, the peg tooth 20, next adjacent the spring disk 25, bears against the outer face of the disk 25 before the angular displacement of the sprocket 16 is completed. This prevents the tooth from entering slot 28 and striking an edge of slot 22 thus locking the sprocket 16 against rotative movement.

The disk 25 is made of spring steel or any other type of highly resilient material. It is spaced from the driven member 21 by means of the disk 24 and is backed on its opposite side by the resilient disk 26 and the metal disk 27. Disks 24 and 27 are made of rubber neoprene or other resilient material. It is important that disk 24 be resilient and have a diameter less than that of the disk 25. This is necessary to permit the spring disk 25 to bend or flex slightly inwardly (Fig. 15) when located between two teeth 20 so that one of the teeth 20 is held in constant engagement with the indexing face 23. Since the member 21 is rigid and axially stationary, the indexing face 23 provides a means of indexing or holding the sprocket 16 in an exact angular position after each movement thus assuring the alignment and exact framing of each picture frame during the time it is projected on a screen.

Figs. 8, 9, and 10 show three progressive steps as the driving assembly 15 rotates the sprocket 16, and in its final step indexes the sprocket while it is stationary. In Fig. 8 the finger 19 is about to engage one tooth 20. As driving assembly 15 continues to rotate finger 19 engages one tooth (Fig. 9) and cams against it to rotate sprocket 16. The cammed tooth 20 passes through opening 22 in spring disk 25 as the sprocket 16 rotates. Shortly before the completion of one rotative step, that is where the cammed tooth 20 passes over the transition point between the tooth 19 and face 23, another tooth 20 to the right of the cammed tooth (Fig. 9) bears against the outer face of spring disk 25. Upon completion of the rotative step (Fig. 10) the sprocket is stationary and held in an exact angular position by the disk 25 and indexing member 21 located between two adjacent teeth 20. This is the result of the spring disk positively urging a peg against the indexing surface 23.

One difficulty encountered in present day motion picture translating mechanisms is the misframing and misalignment of the picture caused by the inertia of the driven sprocket. Conventional sprockets for motion translating mechanisms are fabricated of steel or other metals. These materials are heavy and have high inertia. As a result, the high angular velocity and abrupt stopping and starting of the sprockets creates quite an inertia. This adversely affects the accurate indexing of the sprocket at the end of each movement. The sprocket 16 of this invention is designed to avoid these undesirable effects.

The entire sprocket, consisting of the pair of radially extending flanges 44 and 43, peg teeth 20, and teeth 41 on flange 44, is made as a unitary item from nylon. By making the sprocket of nylon, its inertia is reduced almost to zero thus permitting the sprocket to be started and stopped with a minimum of energy. This reduction in inertia results in decrease in the stress exerted on the spring disk 25. Most importantly, this permits the sprocket to be accurately indexed at the end of each movement.

The reduction in inertia resulting from the nylon sprocket permits the spring disk 25 to be fabricated from lighter gauge metal. Less wear on the disk 25 and driving member 21 also results. The friction between the elements is considerably decreased.

The nylon sprocket is self lubricating, thus eliminating the need of complicated lubricating means where heretofore has been necessary to prevent the lubricant from contacting the film. The nylon sprocket 16 also silences the operation of the mechanisms. Upon reducing the inertia effect of the sprocket it has been found that the size, complexity and cost of indexing mechanisms can be greatly reduced. One example of this is the indexing mechanisms previously described.

Another disadvantage of present day motion translating mechanisms for movie projectors is the complicated adjustment means for originally adjusting the exact framing of the picture frame within the projector means. The accurate indexing of the sprocket at the end of each movement is extremely important. However, if the original framing of the picture is incorrect, two pictures will still be projected on the screen regardless of the accuracy of the indexing mechanism. Thus, it is important that the picture frames be originally adjusted so that only a single frame is projected at any one time.

In order to make such an adjustment with a mechanism of the type described herein, it is necessary to adjust the driving member 15 longitudinally of its rotative axis. Adjustment of the driving assembly 15 along the longitudinal axis does not change the length of the arc or movement of each step but it does vary the exact angular position of the sprocket after each movement, thus changing the position of the picture frame with respect to the projection lens axis.

Fig. 11 illustrates the preferred mechanism for adjusting the driving unit 15 along its rotative axis. The driving unit 15 is shown mounted on the hub 42 of the pulley 17 in the manner previously described. Pulley 17 is mounted on the shaft 18 which is journaled at each end in the housings 30 and 31. The shaft 18 at one end passes through and is journaled in a nylon bushing 32 which is seated in the enlarged opening 47 of the housing 30. Bushing 32 has grooves 39 (Fig. 12) in its upper surface in which the splined end 40 of adjusting screw 37 is engaged. The splined screw 37 is also fabricated of nylon. On the opposite side of the pulley is an open helical compression spring 33 coiled around the shaft between the hub 34 of the pulley 17 and the housing 31. The spring 33 bears against a steel washer 35 behind which is a nylon washer 36. The spring 33 urges or biases the pulley 17 to the left against the bushing 32. Simply by adjustment of the screw 37, the axial position of bushing 32 is changed and thus the exact position of the pulley 17 and the driving assembly 15 can be shifted. Accordingly, by adjusting screw 37 the original framing of the picture may be accurately and quickly accomplished.

*Operation*

The operation of the apparatus is initiated by first threading the film 17 through the projector machine 2. In threading the machine the film meshes with the teeth 41 of the sprocket 16 and is thus run intermittently through the projector at the usual rate of 16 frames per second. As a result, the film is moved, held stationary, then moved again to give the optical illusion of motion. This entire operation is conventional and is well known by those skilled in the art.

Before the entire film is passed through the projector, its frames are adjusted with respect to the projection aperture and lens by manipulation of the screw 37 to axially position the driving assembly 15. When the frame is exactly adjusted so that only one picture is seen as the film passes through the projector, the apparatus is ready for continuous operation. In its operation, the pulley 17 is driven by a belt separately connected to a motor, not shown, in the projector 2. Pulley 17 rotates the driving assembly 15 which has its driving member 21 and spring disk 25 intermeshed with the peg teeth 20 of the sprocket 16. As pulley 17 rotates, once every revolution the finger 19 engages one of the teeth 20 causing the sprocket 16 to rotate one step. After the finger 19 disengages the tooth 20, the movement of sprocket 16 is stopped and it is held stationary until the next revolution of the driving unit 15. During this stationary period of sprocket 16, it is indexed by means of the spring disk 25 and the indexing surface 23 of driving member 21. The indexing surface 23 and the spring disk 25 are located between two teeth with each engaging a tooth 20. The disk 25 is flexed or bent inwardly very slightly causing one of the teeth 20 to be held in constant tight, bearing engagement with the indexing surface 23. As a result the sprocket 16 is held in an exact stationary position after each movement. During this dwell period the light beam from bulb 38 projects a beam of light through an opening in the pulley 17, through the film and against a projection screen. Accordingly, the pictures are accurately framed when projected on the screen.

The low inertia of the sprocket 16 is important to this mechanism. Without it the mechanism will not function. The forces necessary to overcome the inertia of heavier and more dense materials are such that a spring capable of absorbing these materials is impractical. Further, the shock loads attendant initiation of movement of the sprocket result in such excessive wear and noise that the mechanism has little if any practical life. The denser and heavier materials prevent rapid, accurate positioning of the sprocket resulting in film flicker as the film is rocked into position after opening of the aperture controlling the light beam.

This invention provides a precise motion translating device for translating continuous rotary motion to intermittent rotary motion. This mechanism is simpler than other motion translating mechanisms of this type. It is more accurate than such mechanisms. It is characterized by greater dependability and durability. The use of a low inertia, nylon, film driving sprocket makes it possible to use a more compact motion translating assembly. Further, this assembly may be fabricated of thinner gauge material. The objectable noise characteristics of these mechanisms is materially reduced. The practical velocity range of the mechanism is substantially increased since the low inertia of the nylon sprocket permits accurate indexing even at speeds far in excess of sixteen frames per second. The invention provides a positive, accurate and yet simple means for adjusting the picture frame with respect to the projector's light aperture.

It should be understood that in describing this invention I have shown preferred embodiments which should not be considered to be the only embodiments which can be made without departing from this invention. Modifications may be made which will fall entirely within the spirit of this invention and those modifications shall be considered to be covered by this invention except as expressly stated in the appended claims.

I claim:

1. A motion translating device for converting continuous rotary motion to intermittent rotary motion and having a driving member and a driven member, said device comprising: said driven member having teeth projecting substantially parallel to the axis of its rotation; said driving member having a cam element adapted to engage one of said teeth for intermittently moving said driven member; said driving member having a rigid indexing surface essentially stationary axially of said driving member; said driving member having a resilient element; said indexing surface being directed away from said resilient element; said indexing surface and said resilient element both being received between adjacent teeth of said driven member and being so spaced as to provide a force due to such spacing and the resiliency of said resilient element which acts to hold said driven member from rotation through contact by said indexing surface and said resilient element with said adjacent teeth.

2. A motion translating device for converting continuous rotary motion to intermittent rotary motion and having a driving member and a driven member, said device comprising: said driven member having teeth projecting substantially parallel to the axis of its rotation; said driving member comprising a disk having a cam element adapted to engage one of said teeth in each cycle of rotation for intermittently moving said driven member; said disk also having a rigid indexing surface; a resilient disk spaced from said first disk and adapted to engage one of said teeth and to rotate with said first disk, said indexing surface being on the face of said first disk remote from said resilient disk, both said disks being received between adjacent teeth of said driven member and being so spaced as to provide a force due to such spacing and the resiliency of said resilient disk which acts to hold said driven member from rotation through contact by said disks with said adjacent teeth.

3. A motion translating device for converting continuous rotary motion to intermittent rotary motion and having a driving member and a driven member, said device comprising: said driven member having teeth projecting substantially parallel to the axis of its rotation; said driving member comprising a first disk having a cam element adapted to engage one of said teeth on each cycle of rotation for intermittently moving said driven member, said disk having a rigid indexing surface, a resilient disk rotatable with said first disk and held in spaced relationship therewith, said indexing surface being on the face of said first disk remote from said resilient disk, both said disks being received between adjacent teeth of said driven member and being so spaced as to provide a force due to such spacing and the resiliency of said resilient disk which acts to hold said driven member from rotation through contact by said disks with said adjacent teeth.

4. A motion translating device for converting continuous rotary motion to intermittent rotary motion and having a driving member and a driven member, said device comprising: said driven member having peg teeth projecting substantially parallel to the axis of its rotation; said driving member comprising a resilient disk and a driving disk having a finger inclined axially therefrom, said driving disk having a rigid indexing surface on an outer side thereof remote from said resilient disk; a spacer between and separating said disks said spacer having a diameter less than the diameter of said resilient disk, both said disks being received between adjacent teeth of said driven member and being so spaced as to provide a force due to such spacing and the resiliency of said resilient disk which acts to hold said driven member from rotation through contact by said disks with said adjacent teeth.

5. Means for translating continuous rotary motion to intermittent rotary motion and having a driving member and a driven member, rotatable about an axis normal to the axis of said driving member, said driving member having a cam element and said driven member having a plurality of axially projecting teeth adapted to be engaged by said cam element, the improvement in said means comprising: a resilient element on said driving member adapted to engage each of said teeth successively; an indexing surface on said driven member spaced and directed away from said resilient element and adaped to engage each of said teeth successively; means for holding said indexing surface stationary axially of said driven member; both said indexing surface and said resilient element being received between adjacent teeth of said driven member and being so spaced as to provide a force due to such spacing and the resiliency of said resilient disk which acts to hold said driven member from rotation through contact by said indexing surface and said resilient element with said adjacent teeth.

6. Means for translating continuous rotary motion to intermittent rotary motion and having a driving member and a driven member rotatable about an axis normal to the axis of said driving member, said driving member having a cam element and said driven member having a plurality of axially projecting teeth adapted to be engaged by said cam element, the improvement in said means comprising: a resilient element on said driving member adapted to engage each of said teeth successively; an indexing surface on said driven member spaced and directed away from said resilient element and adapted to engage each of said teeth successively; means for holding said indexing surface stationary axially of said driven member; both said indexing surface and said resilient element being received between adjacent teeth of said driven member and being so spaced as to provide a force due to such spacing and the resiliency of said resilient disk which acts to hold said driven member from rotation through contact by said indexing surface and said resilient element with said adjacent teeth; said driven member being of a rigid material having a density and a surface co-efficient of friction no greater than that of nylon.

7. A motion translating device for converting continuous rotary motion to intermittent rotary motion and having a driving member and a driven member, said device comprising: said driven member having peg teeth projecting substantially parallel to the axis of its rotation; said driving member comprising a resilient disk and a driving disk having a finger inclined axially therefrom, said driving disk having a rigid indexing surface on an outer side thereof remote from said resilient disk; a compressible spacer between and separating said disks, both said disks being received between adjacent teeth of said driven member and being so spaced as to provide a force due to such spacing and the resiliency of said resilient disk which acts to hold said driven member from rotation through contact by said disks with said adjacent teeth; said spacer having a diameter less than the diameter of said resilient disk whereby when both of said disks are between a pair of adjacent ones of said teeth, said resilient disk will bend at its periphery.

References Cited in the file of this patent

UNITED STATES PATENTS

| | | |
|---|---|---|
| 689,551 | Kull | Dec. 24, 1901 |
| 1,016,545 | Bultman | Feb. 6, 1912 |
| 1,300,786 | Staude | Apr. 15, 1919 |
| 2,448,164 | Woditsch | Aug. 31, 1948 |
| 2,579,195 | Kurtz et al. | Dec. 18, 1951 |
| 2,596,581 | Mercier | May 13, 1952 |

OTHER REFERENCES

Machine Design, March 1951, page 31.
Machine Design, February 1952, page 156.
Machine Design, March 1954, pages 153 and 156.